Dec. 29, 1942.          E. M. CLAYTOR           2,306,865
               OVERDRIVE CONTROL SYSTEM
                  Filed Dec. 9, 1940

INVENTOR
Edward M. Claytor
BY
Spencer Hardman & Fehr
his ATTORNEYS

Patented Dec. 29, 1942

2,306,865

UNITED STATES PATENT OFFICE 2,306,865

OVERDRIVE CONTROL SYSTEM

Edward M. Claytor, Anderson, Ind., assignor to General Motors Corporation, Detroit, Mich., a corporation of Delaware Application December 9, 1940, Serial No. 369,246

4 Claims. (Cl. 192—3)

This invention relates to electrical control systems for automobile overdrives and, particularly to the type of overdrive control system in which the engine ignition is rendered inoperative for the purpose of facilitating retraction of the sun gear locking pawl from the sun gear locking ring, and in which the ignition is rendered operative again in response to the retraction of the pawl. In this type of system the pawl is usually retracted immediately following the rendering of the ignition inoperative. However, if the pawl should fail to come out the ignition will remain inoperative under certain driving conditions.

It is an object of the present invention to automatically restore the ignition in response to deceleration of the car to a predetermined low speed so that the engine will be operative to propel the car at least at low speed. This will give the car driver an opportunity to accelerate again to a speed at which the ignition becomes inoperative and give the pawl a second opportunity to come out when the ignition is interrupted. In any event, the driver will have means of transportation to a service garage.

Further objects and advantages of the present invention will be apparent from the following description, reference being had to the accompanying drawing wherein preferred embodiments of the present invention is clearly shown.

Figure 1:
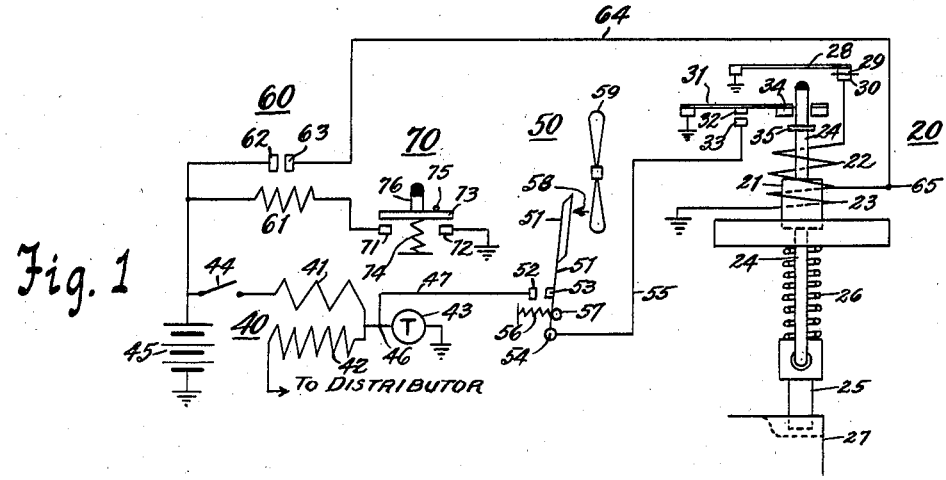
Fig. 1 is a wiring diagram of an overdrive control system embodying the present invention applied to the type of overdrive in which the pawl is spring urged into engagement with the sun gear locking ring and in which the solenoid operates to retract the pawl. In this system the ignition is rendered inoperative by grounding the ignition apparatus between the coil and the timer.

Referring to Fig. 1, 20 designates the overdrive solenoid. Solenoid 20 comprises an armature 21 surrounded by an attracting coil 22 and a holding coil 23. Armature 21 is connected with a rod 24 the lower end of which is connected with a pawl 25 urged by spring 26 into engagement with a sun gear locking ring 27. The upper end of rod 24 is adapted to engage a resilient contact arm 28 carrying a contact 29 for engaging a contact 30 to connect the attracting coil 22 with ground. When coils 22 and 23 are energized the armature 21 moves upwardly, provided the ignition is interrupted, and the upper end of rod 24 engages support 28 to separate contact 29 from contact 30 thereby opening the circuit of the main attracting coil 22 thus leaving holding coil 23 operating to maintain the armature 21 in operative position.

The solenoid 20 controls a switch for grounding the ignition until the pawl 25 is retracted. This switch comprises a resilient contact support 31 carrying a contact 32 for engaging a contact 33. Support 31 carries an armature 34 which, when the coils of solenoid 20 are energized, moves downwardly to close contacts 32 and 33. The closing of contacts 32 and 33 will ground the ignition in the manner to be described. The ignition being interrupted, pressure between the sun gear locking ring 27 and the pawl 25 will be interrupted thereby facilitating the retraction of the pawl 25. During this retraction a collar 35 on rod 24 engages armature 34 and causes the same to move upwardly to separate contact 32 from contact 33. Then the ignition ground is broken and ignition is resumed.

The ignition appartus comprises a coil 40 having a primary winding 41 and a secondary winding 42 connected respectively with a timer 43 and with a distributor not shown. Primary winding 41 is connected by switch 44 with battery 45. From a point 46 between the coil 40 and the timer 43 a wire 47 leads to a contact 52 of an air vane switch 50. Switch 50 comprises an air vane 51 carrying contact 53 for making engagement with the contact 52. Vane 51 is pivoted at 54 and is connected by wire 55 with contact 33. A spring 56 urges the vane 51 into normal position against a stop 57. At a certain predetermined car speed the vane 51 moves counterclockwise under the action of an air current represented by arrow 58 caused to impinge upon the vane 51 by the engine cooling fan 59. The car speed at which switch 50 closes corresponds to the speed at which the overdrive becomes operative. In the type of overdrive represented at Fig. 1, the going in to overdrive is effected by means of a centrifugal clutch. If, for example this clutch is designed to cause the transmission to go into overdrive at 30 M. P. H., the switch 50 should be constructed so as to close at a somewhat lower speed, for example 25 M. P. H. Therefore, by the time this clutch operates the switch 50 will have been closed.

When it is desired to come out of overdrive in the higher speed range, it is necessary to connect the solenoid windings with the battery 45. This is accomplished by energizing the coil 61 of a relay switch 60 having normally open contacts 62 and 63 for connecting the battery 45 with a wire 64 leading to a common terminal 65 to which the coils 22 and 23 of the solenoid 20 are connected. The circuit of the coil 61 of relay 60 is controlled by a driver operated kick switch 70 having stationary contacts 71 and 72 normally unbridged by movable contact 73 urged by a spring 74 against a stop 75. When the driver presses the switch rod 76 downwardly to close the switch 70 the battery 45 will be connected with the coil 61 and the contacts 62 and 63 will be closed thus completing a circuit between the battery 45 and the windings of solenoid 20. Then the armature 21 will be attracted upwardly and the armature 34 downwardly. Contacts 52—53 and contacts 32—33 then being closed, the ignition will be grounded to render the engine inoperative and thus relieve the pressure between the pawl 25 and sun gear locking ring 27 and thereby facilitating the retraction of the pawl 25. The upward movement of the rod 24 causes the switch contacts 32 and 33 to be separated thereby restoring the ignition after the pawl 25 has been retracted.

If, for any reason the pawl should fail to be retracted altho the ignition be rendered inoperative, ignition will be restored automatically when the vehicle decelerates to a predetermined lower speed at which the switch 50 will open thereby interrupting the ignition ground circuit. The switch 50 may be constructed to open at 15 M. P. H. so that the engine will be operative to propel the vehicle speeds up to the closing speed of switch 50, which is 25 M. P. H. This will give the driver an opportunity either to drive to a service garage or to attempt to take the transmission out of overdrive by attempting to accelerate the car above 25 M. P. H., whereupon the switch 50 will close and perhaps the pawl 25 will be retracted during the second period of ignition interruption. At any rate the driver will be able to drive the car at speeds below 25 M. P. H altho the transmission may remain in overdrive.

Figure 2:
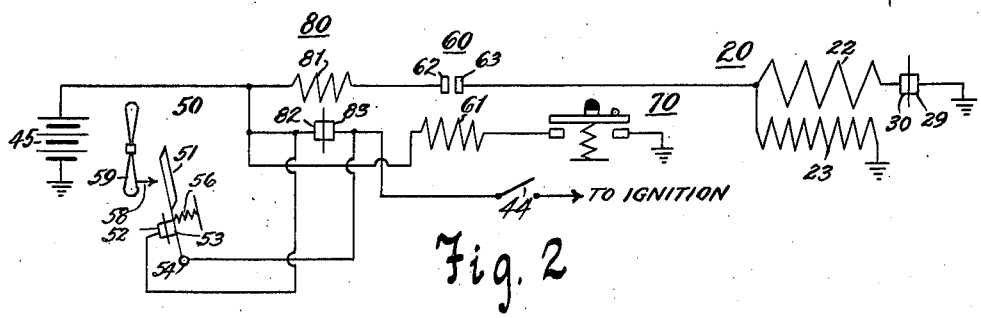
Fig. 2 is a wiring diagram of a control system applied to the same type of overdrive as indicated in Fig. 1, the system in Fig. 2 being one in which the ignition apparatus is disconnected from the current source in order to render it inoperative.

In the system shown in Fig. 2 an ignition circuit interrupting relay 80 is employed. Relay 80 comprises a magnet coil 81 connected between the battery 45 and contact 62 of relay switch 60. Ignition interrupting relay 80 provides contacts 82 and 83 for connecting battery 45 with ignition switch 44 which is connected with the ignition apparatus. The contacts 52 and 53 of air vane switch 50, when closed, provide a by-pass around contacts 82 and 83.

The type of overdrive with which the system shown in Fig. 2 is used is the same type as that with which the system shown in Fig. 1 is used. This type is one in which the overdrive is effected automatically in response to the operation of a centrifugal clutch. The switch 50 (of Fig. 2) is set to open at a speed somewhat below the speed to which this clutch become operative. When it is desired to come out of overdrive the switch 50 will be open and the by-pass around contacts 82 and 83 of relay 80 will be interrupted. To come out of overdrive when using the system of Fig. 2, the operator closes switch 70 whereupon relay 60 closes and connects the battery with the windings of solenoid 20 and with the winding 81 of relay 80. Since the attracting coil 22 of solenoid 20 is one having relatively low resistance the current flow thru 81 will be relatively high and will be sufficient to cause contacts 82 and 83 to open thereby disabling the ignition by disconnecting the ignition apparatus from the battery 45. Normally the pawl 25 will be retracted and the contact 29 will be separated from the contact 30, as in the case of Fig. 1, thus rendering the holding coil 23 operative to maintain the pawl 25 in retracted position. The open circuiting of the magnet coil 22 considerably reduces the current flow from the battery through the coil 81 of relay 80; and relay 80 closes to restore the ignition. Obviously the restoration of the ignition depends on the separation of contact 29 from contact 30 and that separation depends on retraction of the pawl 25. If, for some reason the pawl 25 be not retracted altho solenoid 20 is energized, heretofore it would be necessary to partially close the throttle to reestablish ignition. However, I provide the switch 50 which, like the switch 50 of Fig. 1 will close at 15 M. P. H. for example, to restore the ignition at a lower car speed regardless of failure of the pawl to be retracted from the sun gear, and regardless of throttle position.

Figure 3:
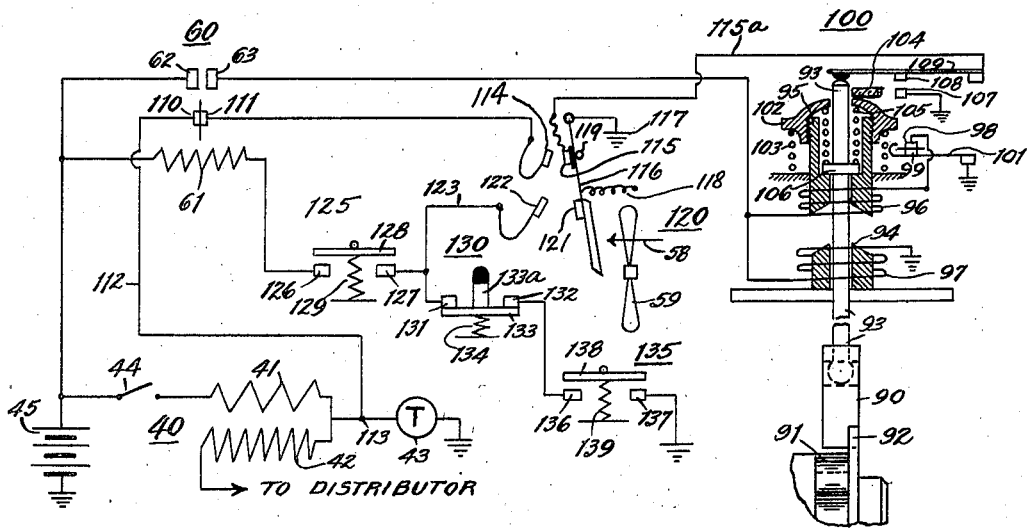
Fig. 3 is a wiring diagram of a control system applied to the type of overdrive in which a solenoid causes the pawl to engage the sun gear locking ring and in which a spring retracts the sun gear. In this system the ignition is rendered inoperative by grounding the ignition circuit between the coil and the timer.

The system shown in Fig. 3 is one which is applied to the type of overdrive in which the pawl is urged electromagnetically into locking engagement with the sun gear locking ring and is retracted by a spring. In Fig. 3 the pawl 90 is blocked from engagement with the sun gear locking ring 91 by blocker plate 92 which releases the pawl 90 at a time when there is reversal of torque between the engine and transmission. Pawl 90 is connected with a pawl rod 93 which extends thru the stationary core 94 and the movable armature 95 of the overdrive solenoid designated by numeral 100. Armature 95 and core 94 are surrounded by the solenoid windings comprising an attracting coil 96 and a holding coil 97. Coil 96 is connected with ground to the battery thru contacts 98 and 99, the latter being mounted on a resilient grounded support 101 and having an end located in the path of the movement of the flange of a nut 102 fastened to the armature 95. The armature 95 is held in the upper position by a spring 103 urging the nut 102 against a stop 104. Downward movement from the armature 95 to the rod 92 is transmitted thru a spring 105 located between the nut 102 and a shoulder 106 in rod 93. The solenoid controls an ignition grounding switch comprising contacts 107 and 108, the latter being connected with a resilient support 109 which is actuated by the rod 93. When the rod 93 moves downwardly to cause the pawl 90 to engage the sun gear locking ring 91 the contacts 107 and 108 will be closed.

The solenoid control relay 60 of Fig. 3 includes a pair of normally closed contacts 110 and 111. Contact 110 is connected by wire 112 with a point 113 of the ignition circuit between coil 30 and timer 43. Contact 111 is connected with a contact 114 adapted to engage a contact 115 insulatingly supported by an air vane 116 grounded at 117 and forming a part of air vane switch 120. Contact 115 is connected by wire 115a with resilient contact blade 109 of solenoid unit 100.

Vane 116 is normally urged by a spring 118 against a stop 119. Vane 116 carries a contact 121 for engaging a resiliently supported contact 122 connected by wire 123 between gear switch 125 and kick switch 130. The circuit of coil 61 of relay 60 is controlled by series connected gear switch 125, kick switch 130 and a governor switch 135.

Switch 125 comprises stationary contacts 126 and 127 normally unbridged by contact 128 urged upwardly by spring 129. Switch 125 is closed automatically when the regular automobile transmission is in intermediate or high condition.

Kick switch 130 comprises stationary contacts 131 and 132 normally bridged by contact 133 urged upwardly by a spring 134. The switch operating rod 133a is located in the path of the movement of the accelerator pedal and is so related to it that the downward movement of the accelerator pedal is required for quick acceleration will open the switch 130.

Governor switch 135 comprises stationary contacts 136 and 137 normally unbridged by contact 138 urged upwardly by spring 139. By a speed responsive device not shown this switch is caused to close at 30 M. P. H. This speed responsive device may be in the form of an air vane or may be one which is operated by rotating shaft connected with the vehicle transmission. If, for example, a governor switch 135 is constructed to close at 30 M. P. H. then the air switch 120 will be constructed to close contacts 114—115 at a somewhat lower speed, for example 25 M. P. H. Switch 120 will be constructed to open these contacts at a lower speed, for example, 15 M. P. H. Switch 120 is constructed so as to close contacts 121 and 122 at a speed in the higher driving range such as 55 M. P. H.

The operation of the system shown in Fig. 3 is as follows: The car being in second or high gear switch 125 will be closed. When the car speed attains 30 M. P. H., for example, the switch 135 will close. Relay coil 61 will then be connected with the battery 45 and contacts 62 and 63 will close to connect the solenoid windings 96 and 97 with the battery 45; and contact 110 and 111 will open so as to provide a gap in the ignition ground-out line. The driver then releases the accelerator pedal to allow the engine speed to fall a certain percentage below equivalent car speed thereby causing a reversal of torque between the engine and transmission thereby causing the blocker plate 92 to release the pawl 90 thereby permitting the spring 105 (compressed by the downward movement of the armature 95) to move the pawl into engagement with the locking ring 91. Then the transmission is in overdrive.

When it is desired to pass a car on the road, the driver will move the accelerator pedal downwardly sufficiently for quick acceleration thereby opening switch 130 and deenergizing relay 60. Then the contacts 62 and 63 will open to disengage solenoid 100 and contacts 110 and 111 will close to complete a short circuit of the ignition apparatus which includes the following: point 113 in the line between coil 40 and timer 42, wire 112 contacts 110 and 111 of relay 60, contacts 114 and 115 of air switch 120 and contacts 107 and 108 of solenoid unit 100. The ignition grounding circuit being then completed, the engine is non-operative and the pressure between the pawl 90 and the locking ring 91 is relieved, thereby permitting the spring 103 to move the pawl 90 upward. By the time the pawl 90 has been fully retracted, the contacts 108 and 107 will be separated thereby interrupting the ignition ground and restoring the ignition. If, however, the pawl should fail to be retracted, ignition would not be restored were it not for the presence of the switch 120 which provides for the opening of the ignition ground by the separation of contacts 114 and 115 which takes place at a speed of 15 M. P. H.

Therefore the engine will propel the vehicle at speeds up to just below 25 M. P. H. altho the transmission remains in overdrive.

The switch 120 of Fig. 3 has the additional feature of providing for the by-pasing of switches 130 and 135 at speeds in the higher range (55 M. P. H. for example) by closing contacts 121 and 122 so that the transmission can not be taken out of overdrive in the higher speed range.

From the foregoing description of three embodiments of the present invention it is apparent that I have provided in combination with means for interrupting ignition when it is desired to come out of overdrive, means for restoring ignition in response to coming out of overdrive, a means responsive to deceleration of the car to a predetermined lower speed for restoring the ignition in any event regardless of failure of the pawl to release the sun gear locking ring.

It will be understood that the illustration of switches 150 and 120 is purely diagrammatic and that various well known spring toggle connections may be employed to obtain the desired speed differential between the closing and opening of contacts 52 and 53 of switch 50 or between the closing and opening of the contacts 114 and 115 of switch 120.

While the embodiments of the present invention as herein disclosed, constitutes a preferred form, it is to be understood that other forms might be adopted, all coming within the scope of the claims which follow.

What is claimed is as follows:

1. An overdrive control system for controlling the sun gear locking pawl of an overdrive transmission, said system comprising a solenoid for controlling the pawl, means for controlling the solenoid, and engine ignition controlling means having provisions for rendering the ignition inoperative in response to conditioning the solenoid for taking the transmission out of overdrive, having provisions for restoring the ignition in response to retraction of the pawl for the sun gear, and having speed responsive provisions for restoring the ignition at a car speed less than the speed at which the transmission goes into overdrive, said last-mentioned provisions being operative regardless of failure to retract the sun gear locking pawl.

2. An overdrive control system for controlling the sun gear locking pawl of an overdrive transmission, said system comprising a solenoid for controlling the pawl, means for controlling the solenoid, an ignition grounding circuit for rendering the ignition inoperative and comprising a normally open switch closed in response to conditioning the solenoid for taking the transmission out of overdrive and opened in response to retraction of the sun gear locking pawl, and a normally open switch closed in response to a certain car speed corresponding approximately to the speed at which transmission goes into overdrive, but opening in response to deceleration to a lower speed.

3. An overdrive control system for controlling the sun gear locking pawl of an overdrive transmission, said system comprising a solenoid for controlling the pawl, means for controlling the solenoid, an ignition circuit interrupting relay having its magnet coil fully energized at the time the solenoid is conditioned for taking the transmission out of overdrive whereby the ignition controlling contacts of said relay open to disconnect the current source from the ignition, means responsive to retraction of the pawl for causing said relay to close the ignition interrupting contacts, and means responsive to deceleration of the car to a speed less than that at which going into overdrive takes place for establishing an ignition circuit regardless of failure to retract the sun gear locking pawl.

4. An overdrive control system for controlling the sun gear locking pawl of an overdrive transmission, said system comprising a solenoid for controlling the pawl, an ignition grounding circuit comprising normally closed contacts opened in response to energization of the solenoid to go into overdrive, a pair of normally opened contacts closed in response to a car speed corresponding to the speed at which the transmission goes into overdrive and opened in response to deceleration to a speed less than the lower limit of the normal range of overdrive speed, and a pair of normally open contacts closed when the pawl locks the sun gear and opened when the pawl is retracted, a solenoid control relay for controlling the first mentioned contacts of the ignition grounding circuit, and a speed responsive means for controlling the second-mentioned contacts of the ignition grounding circuit said means being set to close at a speed substantially higher than the opening speed.

EDWARD M. CLAYTOR.